US008396941B2

(12) United States Patent
Douillet et al.

(10) Patent No.: US 8,396,941 B2
(45) Date of Patent: Mar. 12, 2013

(54) DIGITAL LIVING NETWORK ALLIANCE (DLNA) SERVER THAT SERVES CONTENTS FROM IVL SERVICES

(75) Inventors: Ludovic Douillet, Escondido, CA (US); Nobukazu Sugiyama, San Diego, CA (US); David Tao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 600 days.

(21) Appl. No.: 12/221,588

(22) Filed: Aug. 5, 2008

(65) Prior Publication Data

US 2010/0036907 A1 Feb. 11, 2010

(51) Int. Cl.
G06F 15/16 (2006.01)
(52) U.S. Cl. ......... 709/218; 709/203; 709/217; 709/219
(58) Field of Classification Search .................. 709/203, 709/217–219, 231
See application file for complete search history.

(56) References Cited

U.S. PATENT DOCUMENTS

| | | | |
|---|---|---|---|
| 6,442,598 B1 * | 8/2002 | Wright et al. ................. | 709/217 |
| 6,567,857 B1 * | 5/2003 | Gupta et al. .................. | 709/238 |
| 6,678,737 B1 * | 1/2004 | Bucher ......................... | 709/231 |
| 7,376,723 B2 * | 5/2008 | Cho et al. ..................... | 709/223 |
| 8,032,129 B2 * | 10/2011 | Bae et al. ..................... | 455/420 |
| 2001/0013070 A1 * | 8/2001 | Sasaki .......................... | 709/246 |
| 2005/0038874 A1 * | 2/2005 | Ramaswamy et al. ........ | 709/219 |
| 2005/0102281 A1 * | 5/2005 | Takahashi ..................... | 707/3 |
| 2005/0138546 A1 * | 6/2005 | AbiEzzi ........................ | 715/513 |
| 2006/0159109 A1 | 7/2006 | Lamkin et al. | |
| 2006/0161635 A1 * | 7/2006 | Lamkin et al. ................ | 709/217 |
| 2006/0168126 A1 * | 7/2006 | Costa-Requena et al. .... | 709/219 |
| 2006/0184851 A1 * | 8/2006 | Froidcoeur et al. ........... | 714/746 |
| 2007/0211734 A1 * | 9/2007 | Yang et al. .................... | 370/401 |
| 2007/0237090 A1 | 10/2007 | Kim et al. | |
| 2007/0274327 A1 * | 11/2007 | Kaarela et al. ................ | 370/401 |
| 2008/0016177 A1 * | 1/2008 | Jin et al. ........................ | 709/217 |
| 2008/0071795 A1 * | 3/2008 | Fujiwara ........................ | 707/10 |
| 2008/0120412 A1 * | 5/2008 | Icaza .............................. | 709/225 |
| 2008/0126543 A1 * | 5/2008 | Hamada et al. ............... | 709/225 |
| 2008/0233983 A1 * | 9/2008 | Park et al. ..................... | 455/466 |
| 2008/0247541 A1 * | 10/2008 | Cholas et al. ................. | 380/200 |
| 2008/0256232 A1 * | 10/2008 | Fleury et al. .................. | 709/224 |
| 2008/0301103 A1 * | 12/2008 | Kusakabe et al. ............. | 707/3 |
| 2009/0259515 A1 * | 10/2009 | Belimpasakis et al. ........ | 705/10 |
| 2009/0282447 A1 * | 11/2009 | Mehta ........................... | 725/109 |
| 2009/0282470 A1 * | 11/2009 | Yang et al. .................... | 726/12 |

(Continued)

OTHER PUBLICATIONS

J. Yoshida, 2007: "Sony to bring Internet video to Bravia flat TV", EE Times http://www.eetimes.com/news/latest/showArticle.jhtml?articleID=196801732.*

(Continued)

Primary Examiner — Catherine Thiaw
(74) Attorney, Agent, or Firm — Miller Patent Services; Jerry A. Miller

(57) ABSTRACT

Audio and video (A/V) content information is acquired from each of a group of web-based servers located outside of a home network. The A/V content information identifies A/V content stored in association with each of the group of web-based servers. The A/V content information acquired from each of the group of web-based servers is aggregated. The aggregated A/V content information is provided to a DLNA client device within the home network. This abstract is not to be considered limiting, since other embodiments may deviate from the features described in this abstract.

38 Claims, 6 Drawing Sheets

U.S. PATENT DOCUMENTS

2009/0307307 A1* 12/2009 Igarashi .................. 709/203
2010/0088697 A1* 4/2010 Clardy et al. .............. 718/1
2010/0284669 A1* 11/2010 Sasaki .................... 386/252

OTHER PUBLICATIONS

Yean-Joo Oh, Hoon-ki Lee, Jung-Tae Kim, Eui-Hyun Paik and Kwang-Roh Park: 'The DLNA proxy system architecture for sharing in-home media contents via Internet', 2006, pp. 1855-1858.*

Albert Stienstra, 'Technologies for DVB services on teh Internet', proceedings of teh IEEE, vol. 94, No. 1, Jan. 2006, pp. 228-236.*
DVB home networks, Presentation for TVoDSL, Jan. 2007, 24 slides, retrieved from http://www.bloobble.com.broadband-presentations/presentations?itemid=668.*
DVB Internet Protocol TV—DVB FactSheet, Aug. 2007, produced by teh DVB Project Office—dvb@dvb.org.*
"NewSoft's WVR at IDF Combines Wireless Broadcasting with Digital Home Compatibility," NewBay Media, Mar. 7, 2006.

* cited by examiner

DIGITAL LIVING NETWORK ALLIANCE (DLNA) SERVER THAT SERVES CONTENTS FROM IVL SERVICES

CROSS REFERENCE TO RELATED DOCUMENTS

The documents titled "ContentDirectory:1 Service Template Version 1.01," by the UPnP™ Forum, dated Jun. 25, 2002, "MediaServer:1 Device Template Version 1.01," by the UPnP™ Forum, dated Jun. 25, 2002, and "UPnP™ Device Architecture 1.0, Version 1.0.1," by the UPnP™ Forum, dated Dec. 2, 2003 are incorporated in their entireties by reference as if fully set forth herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A Digital Living Network Alliance (DLNA) home network includes DLNA servers and DLNA clients. The DLNA servers store audio and video (A/V) content within the home network. The A/V content stored on a given DLNA server may be accessed by a DLNA client that is also located within the home network. A user of the DLNA client may select an item of the A/V content stored within the home network on a DLNA server for rendering on the DLNA client. Accordingly, DLNA clients access DLNA servers within a home network to allow users to select and render A/V content stored on the DLNA servers.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
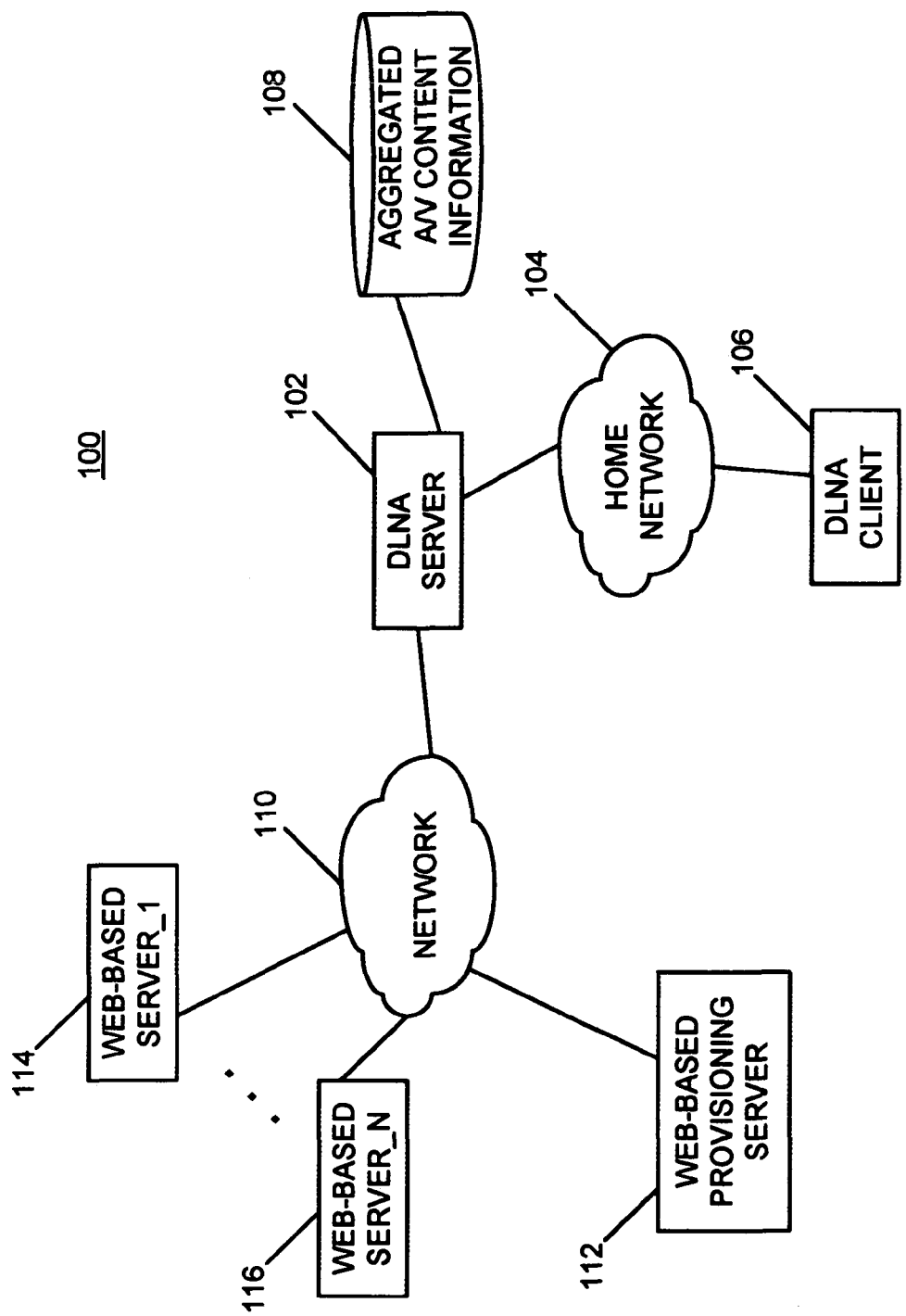
FIG. 1 is a block diagram of an example of an implementation of a system that provides automated access and aggregation of audio and video (A/V) content information representing A/V content stored both inside of and outside of a home network environment consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and is not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The present subject matter provides a Digital Living Network Alliance (DLNA) server device with bridging capabilities for accessing audio and video (A/V) content information representing A/V content stored outside of a home network.

The DLNA server also provides aggregation capabilities for organizing the accessed A/V content information from one or more outside sources with locally-stored A/V content information for access and rendering of A/V content within the home network. The accessed A/V content information may be stored in association with web-based servers that are accessible to an Internet video link (IVL) provisioning server, known in one form commercially via a trademark of Sony Electronics Inc. as the Bravia™ Internet Video Link (BIVL™) provisioning server. The IVL provisioning server establishes account and access privileges with the web-based servers and provides a list of available and authorized servers to the DLNA server. The DLNA server communicates with the authorized web-based servers from the list to retrieve A/V content information for aggregation. A user of a DLNA client device within the home network may select an item of aggregated A/V content stored outside of the home network or stored locally on the DLNA server for rendering within the home network. The DLNA client device may use the DLNA server as a proxy to retrieve the A/V content or may access the associated web-server directly to retrieve the A/V content.

Turning now to FIG. 1, a block diagram of an example of an implementation of a system 100 is shown that provides automated access and aggregation of audio and video (A/V) content information representing A/V content stored both inside of and outside of a home network environment. A DLNA server 102 interconnects via a home network 104 with a DLNA client 106. As will be described in more detail below, the DLNA server 102 provides automated access and aggregation of A/V content information representing A/V content located outside of the home network 104. The DLNA server 102 also aggregates the accessed A/V content information representing A/V content located outside of the home network 104 with A/V content information representing A/V content stored locally within the home network 104 in association with the DLNA server 102. This automated access and aggregation may be performed in response to user queries and may be performed in a scheduled or other deterministic manner.

An aggregated A/V content information database 108 provides storage for the accessed and aggregated A/V content information obtained from servers located outside of and from devices located within the home network 104. The aggregated A/V content information may include A/V identifier elements, such as uniform resource identifiers (URIs) including Internet protocol (IP) addresses to the A/V content or for thumbnail images associated with the A/V content and tokens used to access the A/V content. The A/V identifier elements may be stored within the aggregated A/V content information database 108 to allow a user of a DLNA client device, such as the DLNA client 106, to select an A/V identifier element to access the associated A/V content for rendering. Upon selection of the respective A/V identifier element, the associated URI is accessed at its storage location, either within or outside of the home network 104, to retrieve and render the associated A/V content.

A network 110 provides access to external devices, such as a web-based provisioning server 112 and a web-based server_1 114 through a web-based server_N 116. As will be described in more detail below, the web-based provisioning server 112 may be configured as an IVL provisioning server, known in one form commercially via a trademark of Sony Electronics Inc. as the BIVL™ provisioning server. The web-based provisioning server 112 establishes account authorization and other provisioning to allow access by the DLNA server 102 to A/V content information and A/V content stored on an authorized web-based server. The web-based provisioning server 112 provides a list of authorized web-based servers to the DLNA server 102. The DLNA server 102 communicates with the authorized web-based servers to retrieve and aggregate A/V content information associated with the web-based servers as described above and in more detail below. The aggregated A/V content information may be used by either the DLNA server 102 to retrieve A/V content stored on the associated web-based server.

The A/V content information received by the DLNA server 102 from the web-based servers may include identifiers, such as URIs including IP addresses, associated with the items of A/V content, and tokens used to access the A/V content. The DLNA server 102 may associate and/or map the URIs and IP addresses received to its own IP address to cross reference the external URIs and IP addresses for internal use within the home network 104. The mappings used for cross referencing the external A/V content and the received tokens for accessing the A/V content may be stored within the aggregated A/V content information database 108 in association with the aggregated A/V content information. As such, the aggregated A/V content information provides URIs to the A/V content that allow the DLNA client 106 to request A/V content items from the DLNA server 102 without concern for mapping operations performed by the DLNA server 102. Upon receipt of a request for A/V content, the DLNA server 102 maps the URI and IP address of the request to the URI and IP address associated with the A/V content stored on the associated web-based server. The DLNA server then retrieves the A/V content using the remapped URI and the associated token.

The web-based server_1 114 through the web-based server_N 116 may be any network-based server accessible via the network 110. Examples of web-based servers of A/V content that are presently within the marketplace are Amazon.com®, Yahoo!®, and AOL®. Many other network accessible web-based servers exist and many others are contemplated by the present subject matter. Accordingly, aggregation of A/V content information associated with all such network-accessible web-based servers is considered within the scope of the present subject matter.

The network 110 may be any network, such as the Internet or other network, capable of allowing communication between devices. An example of a web-based protocol suitable for providing communication over the network 110 is the transmission control protocol over Internet protocol (TCP/IP). Markup language formatting, such as the hypertext transfer protocol (HTTP) and extensible markup language (XML) formatting, may be used for messaging over the TCP/IP connection with devices accessible via the network 110. Other web protocols exist and all are considered within the scope of the present subject matter. As described above, the web-based server_1 114 through the web-based server_N 116 may be any device or Internet server or service that stores A/V content and that is accessible via the network 110 that the web-based provisioning server 112 may access and provision to provide A/V content information to the DLNA server 102 for aggregation purposes.

Users of a DLNA client device within the home network 104, such as the DLNA client 106, may access the aggregated A/V content information stored within the aggregated A/V content information database 108 using the DLNA protocol and DLNA-based directory searches. It is understood that a person of skill in the art can readily formulate appropriate messaging to implement the present subject matter based upon and in consideration of the description herein.

A/V content information aggregated from sources outside of the home network 104 is organized within the aggregated A/V content information database 108 as a hierarchical representation with each outside source represented as a separate branch of the hierarchical representation. A user of a DLNA client device, such as the DLNA client 106, may browse the hierarchical representation of the aggregated A/V content information stored within the aggregated A/V content information database 108 or other memory (not shown) to identify and select an item of A/V content for rendering on the respective DLNA client device.

In response to a request for selected item of A/V content, the DLNA server 102 operates as a proxy and retrieves the selected item of A/V content from the associated storage location as described above. For example, if the selected item of A/V content is stored outside of the home network 104 on a web-based device, such as one of the web-based server_1 114 through the web-based server_N 116, the DLNA server 102 maps the URI of the request to the URI associated with the A/V content stored on the associated web-based server. The DLNA server then retrieves the selected item of A/V content from the outside source that stores the A/V content using the remapped URI and the associated token seamlessly and without further user intervention. Alternatively, if the selected item of A/V content is stored within the home network 104, the DLNA server 102 retrieves the selected item of A/V content from the local storage seamlessly and without further user intervention.

Upon retrieval of the selected item of A/V content, the DLNA server 102 sends the retrieved A/V content to the requesting DLNA client device for rendering. Example DLNA client devices include a set top box (STB), personal computer (PC), a personal digital assistant (PDA), a mobile phone, or other mobile device (none shown). Alternatively, the retrieved A/V content may be rendered on any other device associated with the home network 104, including the DLNA server 102, without departure from the scope of the present subject matter.

The aggregation of the A/V content information may be performed by the DLNA server 102 in a variety of ways. For example, the DLNA server 102 may reduce response time by aggregating information associated with available A/V content located outside of the home network 104 in advance of user queries for available A/V content. In this example mode of operation, the DLNA server 102 responds to user queries for available A/V content information without further querying outside A/V content sources, such as the web-based server_1 114 through the web-based server_N 116. The DLNA server 102 maintains the list of available A/V content sources and may update the aggregated A/V content information stored within the aggregated A/V content information database 108 in association with an internal startup, scheduled, or other operation or event associated with the DLNA server 102.

Alternatively, the DLNA server 102 may reduce local A/V content information storage resources by aggregating available A/V content in real time in response to user queries. For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art. In this second example mode of operation, the DLNA server 102 performs specific queries of each device available via the network 110 based upon a user query for available A/V content. As with the previous example, the DLNA server 102 maintains the list of available A/V content sources to facilitate aggregation of A/V content information in response to user queries.

It should be understood that maintenance of a list of available A/V content sources located outside of the home network 104 may be performed in a variety of ways. For example, the DLNA server 102 or the web-based provisioning server 112 may query for new web-based servers as appropriate. Many other possibilities exist to allow the DLNA server 102 to maintain a list of available A/V content sources located outside of the home network and all such possibilities are considered within the scope of the present subject matter.

Accordingly, the DLNA server 102 allows users of client devices, such as the DLNA client 106, located within the home network 104 to identify certain A/V content sources that are available via the network 110 and to search for available A/V content located outside of the home network 104. Additionally, certain of these A/V content sources may require user accounts for access and retrieval of available A/V content. In such a case, the web-based provisioning server 112 provisions the respective service or device to allow the DLNA server 102 to identify and retrieve and aggregate available A/V content information, as will be described in more detail below. Many possibilities exist for provisioning, creation, and association of user accounts by the web-based provisioning server 112 and all are considered within the scope of the present subject matter. For purposes of the present description it is understood that the web-based provisioning server 112 performs appropriate provisioning activities, such as establishing accounts and authorization procedures, to allow the DLNA server 102 to access authorized and available web-based servers. The DLNA server 102 communicates with the provisioned and authorized web-based servers to aggregate A/V content information associated with A/V content stored at the respective web-based servers. As described above, the DLNA server 102 acts as a proxy for the DLNA client 106 to retrieve selected items of A/V content for rendering by mapping between URIs representing the items of A/V content within the aggregated A/V content information and URIs associated with the storage location of the selected items of A/V content. The DLNA server 102 associates the appropriate token with each request for an item of A/V content.

Figure 2:
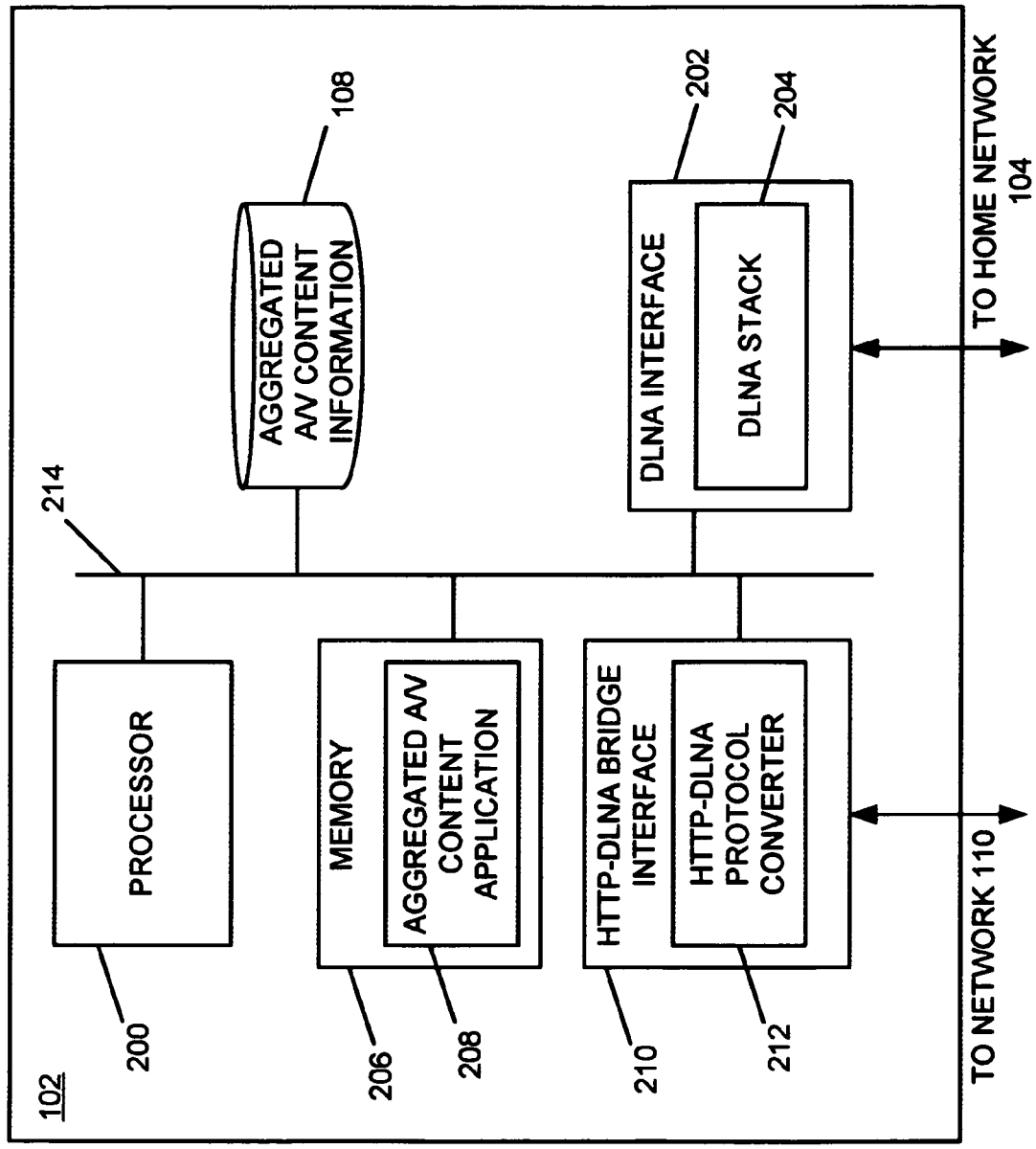
FIG. 2 is a block diagram of an example of an implementation of the DLNA server that provides automated aggregation of A/V content information representing available A/V content associated with the DLNA server and A/V content located outside of a home network consistent with certain embodiments of the present invention.

FIG. 2 is a block diagram of an example of an implementation of the DLNA server 102 that provides automated aggregation of A/V content information representing available A/V content associated with the DLNA server 102 and A/V content located outside of the home network 104. A processor 200 provides computer instruction execution, computation, and other capabilities within the DLNA server 102. A DLNA interface 202 provides communication capabilities for interaction with the DLNA client 106 via the home network 104. The DLNA interface 202 includes a DLNA stack 204 that provides the communication interface with the home network 104.

It should be noted that the DLNA interface 202 is illustrated with component-level modules for ease of illustration and description purposes. It is also understood that the DLNA interface 202 includes any hardware, programmed processor(s), and memory used to carry out the functions of the DLNA interface 202 as described above and in more detail below. For example, the DLNA interface 202 may include additional controller circuitry in the form of application specific integrated circuits (ASICs), processors, and/or discrete integrated circuits and components for performing electrical control activities associated with the DLNA interface 202. Additionally, the DLNA interface 202 also includes interrupt-level, stack-level, and application-level modules as appropriate. Furthermore, the DLNA interface 202 includes any memory components used for storage, execution, and data processing by these modules for performing processing activities associated with the DLNA interface 202. The DLNA interface 202 may also form a portion of other circuitry described below without departure from the scope of the present subject matter.

A memory 206 includes an aggregated A/V content application 208 that organizes aggregated A/V content information available via servers, such as the web-based server_1 114 through the web-based server_N 116, accessible over the network 110. The DLNA aggregated A/V content application 208 includes instructions executable by the processor 200 for performing these and other functions. The aggregated A/V content application 208 may form a portion of an interrupt service routine (ISR), a portion of an operating system, or a portion of a separate application without departure from the scope of the present subject matter. Additionally, any firmware associated with a programmed processor that forms a portion of the DLNA interface 202 may be stored within, executed from, and use data storage space within the DLNA interface 202 or the memory 206 without departure from the scope of the present subject matter.

It is understood that the memory 206 may include any combination of volatile and non-volatile memory suitable for the intended purpose, distributed or localized as appropriate, and may include other memory segments not illustrated within the present example for ease of illustration purposes. For example, the memory 206 may include a code storage area, a code execution area, and a data area suitable for storage of the aggregated A/V content information and storage and execution of the aggregated A/V content application 208 and any firmware associated with a programmed processor that forms a portion of the DLNA interface 202, as appropriate. It is also be understood that, though the aggregated A/V content information database 108 is illustrated as a separate component, the aggregated A/V content information may also be stored within the memory 206 as described above without departure from the scope of the present subject matter. A/V identifier elements, such as URIs to thumbnail images or URIs to A/V content as described above, may be stored within the aggregated A/V content information database 108 or the memory 206 without departure from the scope of the present subject matter.

An HTTP-DLNA bridge interface 210 encapsulates the bridging capabilities of the present subject matter by providing protocol conversion and communication capabilities with web-based servers, such as the web-based provisioning server 112, located outside of the home network 104. An HTTP-DLNA protocol converter 212 provides protocol conversion capabilities to convert between the DLNA protocol and web-based protocols, such as XML and HTTP, as described above and in more detail below. The HTTP-DLNA protocol converter 212 provides protocol mapping, conversion, and communication capabilities to allow the DLNA server 102 to communicate with the web-based provisioning server 112 and web-based servers, such as the web-based server_1 114 through the web-based server_N 116, via the network 110. As described in more detail below beginning with FIG. 3, the HTTP-DLNA bridge interface 210 works in conjunction with the aggregated A/V content application 208 to provide the aggregation capabilities of the DLNA server 102 to modules located within the home network 104, such as the DLNA client 106.

It should be noted that the HTTP-DLNA bridge interface 210 is illustrated as a component-level module for ease of illustration and description purposes. It is also understood that the HTTP-DLNA bridge interface 210 includes any hardware, programmed processor(s), and memory used to carry out the functions of the HTTP-DLNA bridge interface 210 as described above and in more detail below. For example, the HTTP-DLNA bridge interface 210 may include additional controller circuitry in the form of application specific integrated circuits (ASICs), processors, and/or discrete integrated circuits and components for performing electrical control activities associated with the HTTP-DLNA bridge interface 210. Additionally, the HTTP-DLNA bridge interface 210 also includes interrupt-level, stack-level, and application-level modules as appropriate. Furthermore, the HTTP-DLNA bridge interface 210 includes any memory components used for storage, execution, and data processing for performing processing activities associated with the HTTP-DLNA bridge interface 210. The HTTP-DLNA bridge interface 210 may also form a portion of other circuitry described below without departure from the scope of the present subject matter.

The processor 200, the DLNA interface 202, the memory 206, and the HTTP-DLNA bridge interface 210 are interconnected via one or more interconnections shown as interconnection 214 for ease of illustration. The interconnection 214 may include a system bus, a network, or any other interconnection capable of providing the respective components with suitable interconnection for the respective purpose.

Additionally, components within the DLNA server 102 may be co-located or distributed within a network without departure from the scope of the present subject matter. For example, the components within the DLNA server 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the DLNA interface 202 and the HTTP-DLNA bridge interface 210 may be located on network interface cards in a frame-based computer system, while the processor 200 and memory 206 may be located at a local or remote server. Many other possible arrangements for the components of the DLNA server 102 are possible and all are considered within the scope of the present subject matter.

Though the DLNA server 102 is illustrated within FIG. 2 without additional components for user interaction, this should not be considered limiting. The DLNA server 102 may include other devices, such as a display device and an input device, without departure from the scope of the subject matter. For example, the DLNA server 102 may include a display device, such as a cathode ray tube (CRT), liquid crystal display (LCD), light emitting diode (LED), projection, touchscreen, or other display element or panel. Additionally, an input device to provide input capabilities for a user of the DLNA server 102 may include a mouse, pen, trackball, or other input device.

Figure 3:
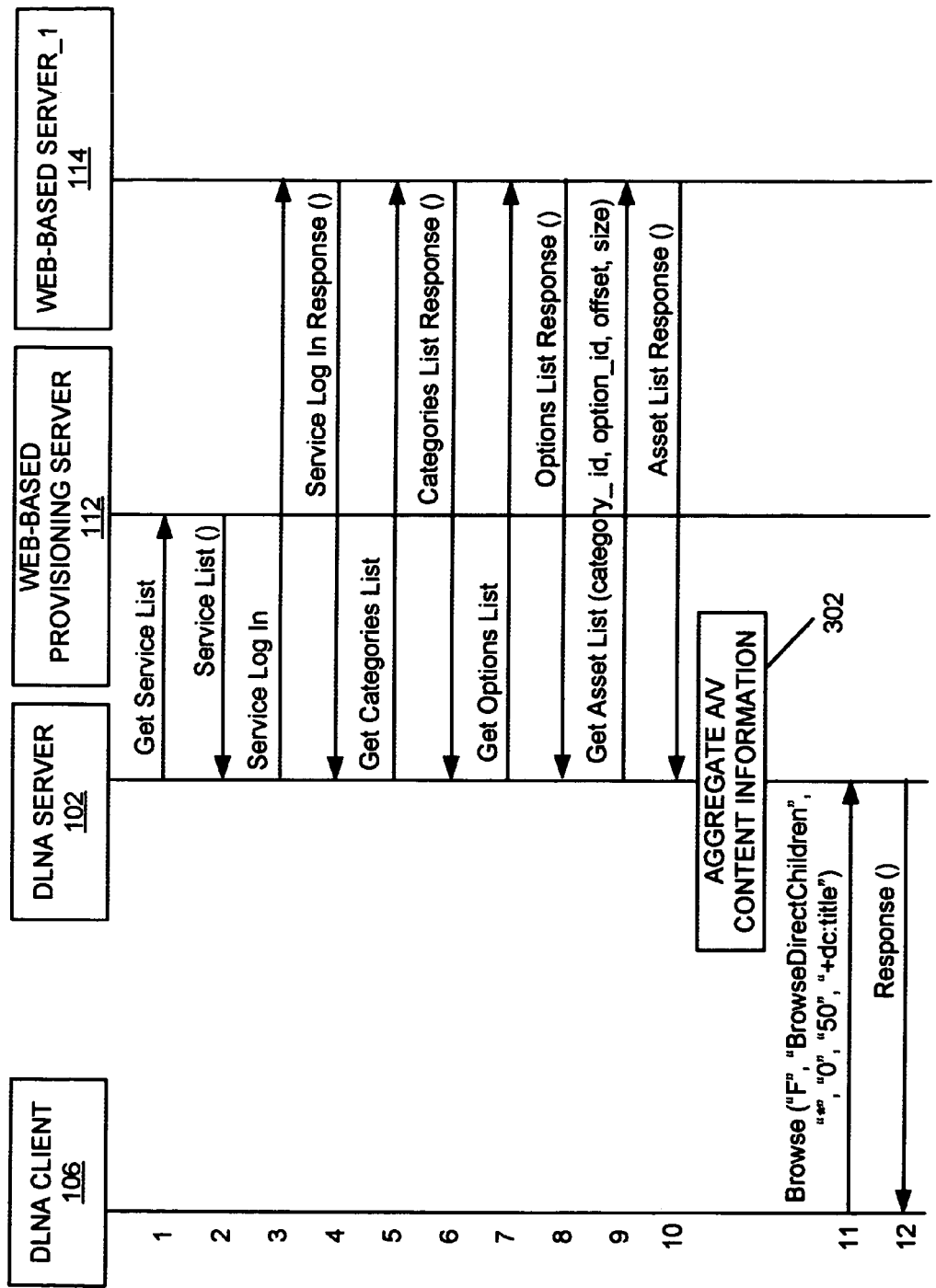
FIG. 3 is a message flow diagram of an example of an implementation of a message flow that may be used to allow a DLNA server to retrieve and aggregate A/V content information associated with one or more web-based servers located outside of a home network with A/V content information stored in association with the DLNA server consistent with certain embodiments of the present invention.

FIG. 3 is a message flow diagram of an example of an implementation of a message flow 300 that may be used to allow a DLNA server, such as the DLNA server 102, to retrieve and aggregate A/V content information associated with one or more web-based servers located outside of the home network 104 with A/V content information stored in association with the DLNA server 102. As can be seen from FIG. 3, the DLNA client 106, the DLNA server 102, the web-based provisioning server 112, and the web-based server_1 114 are shown. The example message flow diagram of FIG. 3 provides an understanding of example messaging interactions between the illustrated components to facilitate a more detailed understanding of the present subject matter.

It is understood that a person of skill in the art can readily formulate appropriate messaging to implement the present subject matter based upon and in consideration of the description herein. For purposes of the present description, it is understood that web protocol messaging, such as markup language messaging, may be used between the DLNA server 102 and either the web-based provisioning server 112 or the web-based server_1 114, while DLNA messaging may be used between the DLNA server 102 and the DLNA client 106.

Regarding the message flow illustrated within FIG. 3, the DLNA server 102 initiates communication with the web-based provisioning server 112 by sending a "Get Service List" message (Line 1). For purposes of the present description, it is assumed that any provisioning performed by the web-based provisioning server 112 to enable access to provision services by the DLNA server 102 has already been completed. In response to receipt of the "Get Service List" message, the web-based provisioning server 112 sends a "Service List" message including access information for any provisioned web-based services (Line 2). As described above, the service list may include provisioned servers/services, such as Amazon.com®, Yahoo!®, and AOL®, and others.

Upon receipt of the "Service List" message, the DLNA server 102 initiates log in procedures to log into a chosen web-based server. In the present example, the chosen web-based server is the web-based server_1 114. The DLNA server 102 sends a "Service Log In" message to the web-based server_1 114 (Line 3) to log into the web-based server_1 114. In response, the web-based server_1 114 sends a "Service Log In Response" message to the DLNA server 102 (Line 4).

Once logged into the web-based server_1 114, the DLNA server 102 may interact with the web-based server_1 114. Accordingly, the DLNA server 102 sends a "Get Categories List" message to the web-based server_1 114 (Line 5). The web-based server_1 114 responds with a "Categories List Response" message (Line 6). For purposes of the present example, the returned list includes a "category_id," such as sports, news, weather, etc. associated with each available category of A/V content information stored in association with the web-based server_1 114.

The DLNA server 102 sends a "Get Options List" message to the web-based server_1 114 (Line 7) to retrieve filtering and sorting options associated with the A/V content available at the web-based server_1 114. The web-based server_1 114 responds with an "Options List Response" message (Line 8). For purposes of the present example, the returned options list includes options for sorting returned information, such as for sorting by date, title, etc. associated with each available category of A/V content information.

Upon receipt of the "Categories List Response" message, the DLNA server 102 begins activities to build an aggregated set of A/V content information based upon A/V information stored in association with the web-based server_1 114. The DLNA server 102 sends a "Get Asset List" message (Line 9) including a category identifier, option identifier for filtering/sorting the returned A/V content information, an offset into the available asset list stored at the web-based server_1 114, and a desired response size to the web-based server_1 114.

The category identifier and option identifier may be based upon the information previously received from the web-based server_1 114. The offset and desired response size may be selected based upon desired bandwidth and storage. By use of filtering and/or sorting criteria, such as the desired response size, the DLNA server 102 may control how much information is returned in response to the "Get Asset List" message. Additionally, use of the offset allows the DLNA server 102 to use subsequent messaging to retrieve additional A/V content information located at a different offset within the available A/V content stored in association with the web-based server_1 114.

Accordingly, by use of filtering and/or sorting criteria, the DLNA server 102 may regulate bandwidth requirements for communication activities associated with aggregating A/V content information and may also regulate storage usage for the aggregated A/V content information. However, it should be noted that while the present example includes use of certain filtering and/or sorting criteria associated with the "Get Asset List" message, this is not to be considered limiting. The DLNA server 102 may request all available A/V content information from the web-based server_1 114 without departure from the scope of the present subject matter.

Returning to the present example message flow of FIG. 3, the web-based server_1 114 responds to the "Get Asset List" message with an "Asset List Response" message (Line 10). The Asset List Response message includes information associated with A/V content information matching the filtering and/or sorting criteria specified within the "Get Asset List" message. The received A/V content information may include URIs to thumbnail images and A/V content, title information, date information, a total number of items available, a total number of items returned, and other information as appropriate. The received A/V content information is now available to be aggregated with locally-stored A/V content information or with previously received and aggregated A/V content information.

Accordingly, in response to receipt of the asset list from the web-based server_114, the DLNA server 102 aggregates the received A/V content information with locally-stored A/V content information at block 302. The aggregated A/V content information may be stored in either the aggregated A/V content information database 108 or the memory 206 as described above. After aggregation of the A/V content information by the DLNA client 102, the aggregated A/V content information is available for access by devices within the home network 104. Accordingly, the DLNA client 106 sends a "Browse" message to the DLNA server 102 (Line 11) including filtering criteria associated with a request specified by a user of the DLNA client 106. The example "Browse" message requests fifty (50) items of A/V content information at offset zero (0) within the container having a container identifier of zero (0) sorted in ascending order based upon the sort option of title.

In response to receipt of the "Browse" message, the DLNA server 102 queries the aggregated A/V content information database 108 with information received within the message. For purposes of the present example, the aggregated A/V content information database 108 is queried for fifty (50) items of A/V content information at offset zero (0) within the container having a Object Identifier (ID) represented by the letter "F" sorted in ascending order based upon the sort option of title. The DLNA server 102 responds with A/V content information from the aggregated A/V content information database 108 by sending a "Response" message to the DLNA client 106 (Line 12).

It should be noted that the example of FIG. 3 shows communications with only one web-based server for ease of illustration purposes only. However, this should not be considered limiting. The DLNA server 102 may continue activities associated with the messaging of Lines three (3) through seven (9) of FIG. 3 and the subsequent aggregation activities associated with block 302 for any additional web-based servers available and/or identified within the received service list without departure from the scope of the present subject matter.

Accordingly, the example message flow of FIG. 3 may be used to allow a DLNA server device, such as the DLNA server 102, to retrieve A/V content information associated with one or more web-based servers located outside of the home network 104 and aggregate the retrieved A/V content information with A/V content information stored in association with the DLNA server 102.

Figure 4:
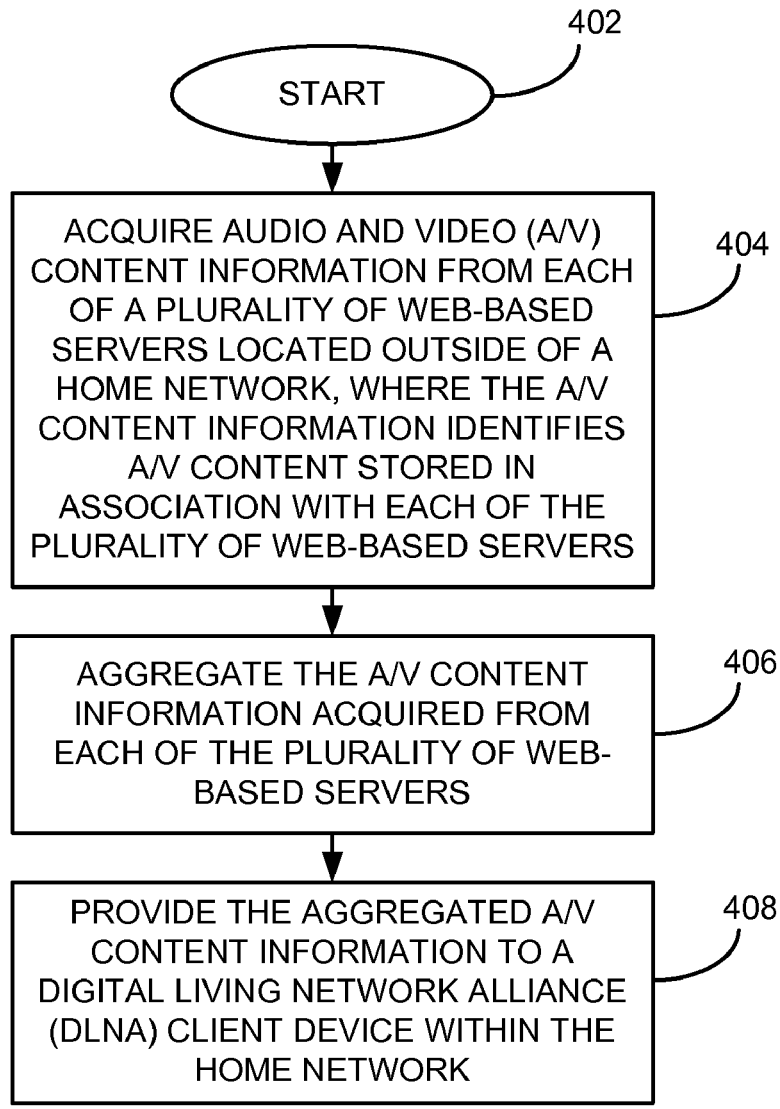
FIG. 4 is a flow chart of an example of an implementation of a process that provides automated aggregation of A/V content information representing available A/V content located outside of the home network consistent with certain embodiments of the present invention.

FIG. 4 is a flow chart of an example of an implementation of a process 400 that provides automated aggregation of A/V content information representing available A/V content located outside of the home network 104. The process 400 along with the other processes described below may be executed by any server device, such as the DLNA server 102, within the home network 104 to aggregate A/V content information that is available from multiple sources of A/V content located outside of the home network 104 with A/V content information for A/V content located within the home network 104. The process 400 starts at 402. At block 404, the process 400 acquires A/V content information from each of a plurality of web-based servers located outside of a home network, where the A/V content information identifies A/V content stored in association with each of the plurality of web-based servers. At block 406, the process 400 aggregates the A/V content information acquired from the plurality of web-based servers. At block 408, the process 400 provides the aggregated A/V content information to a DLNA client device within the home network.

Figure 5:
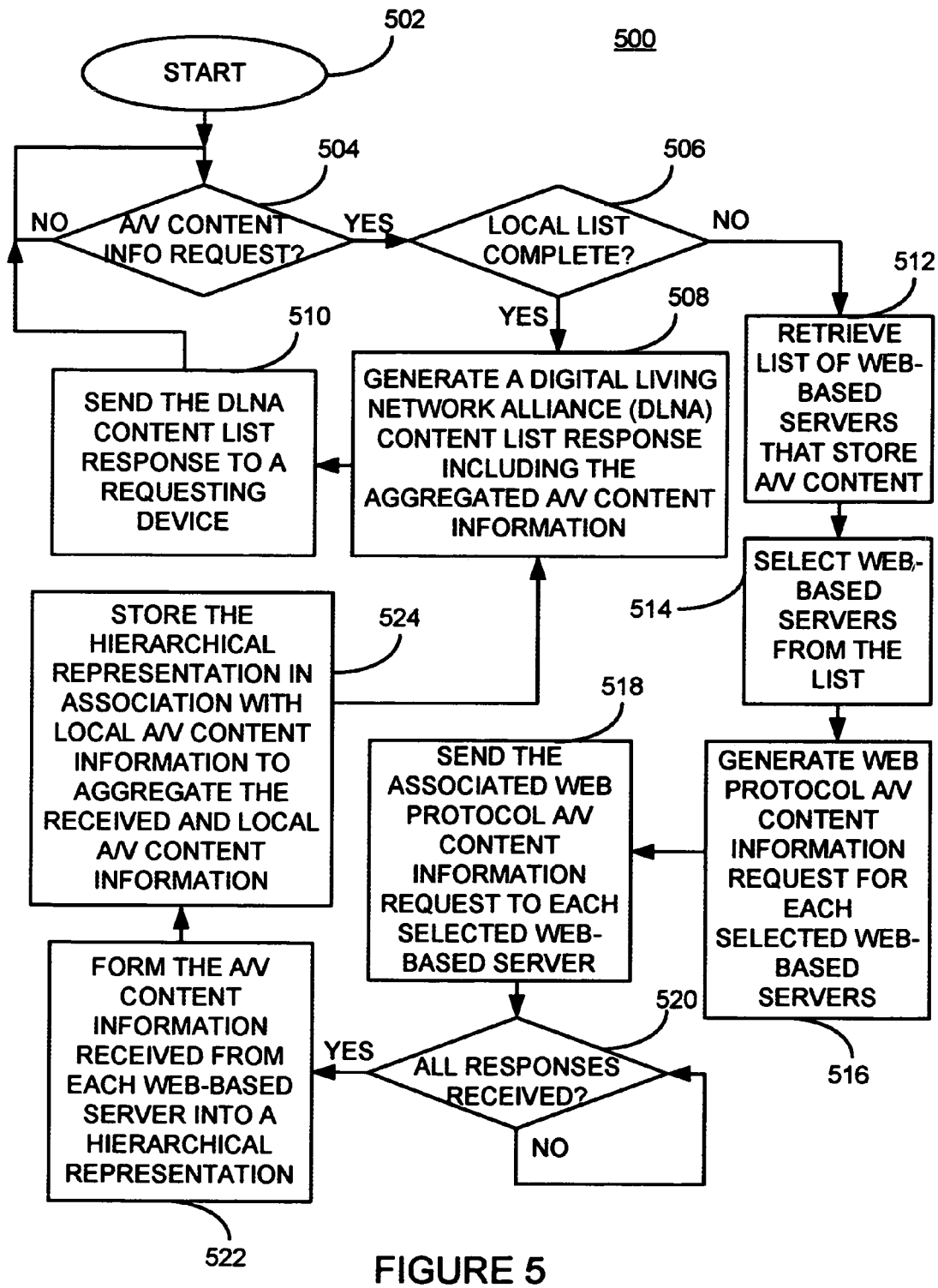
FIG. 5 is a flow chart of an example of an implementation of a process that provides automated aggregation of A/V content information representing available A/V content associated with a DLNA server and A/V content located outside of a home network for access by users of DLNA client devices within the home network consistent with certain embodiments of the present invention.

FIG. 5 is a flow chart of an example of an implementation of a process 500 that provides automated aggregation of A/V content information representing available A/V content associated with the DLNA server 102 and A/V content located outside of the home network 104 for access by users of DLNA client devices within the home network 104. The process 500 starts at 502. The process 500 waits at decision point 504 for an A/V content information request message. An example A/V content information request message may include a DLNA Browse message as described above in association with FIG. 3. As described above, detailed messaging will not be described herein for brevity as a person of skill in the art can create appropriate messages for use in association with the present subject matter based upon the description herein.

At decision point 506, the process 500 makes a determination as to whether a local list of aggregated A/V content information is complete. As described above, the aggregated A/V content information is formed by retrieving A/V content information from web-based server devices, such as the web-based server_1 114, located outside of the home network 104 aggregated with A/V content information associated with locally-stored A/V content. The determination made at decision point 506 may be made based upon status of a locally-maintained list of aggregated A/V content information or other processing to determine whether the aggregated A/V content information is complete. As also described above, processing to compile and update the list of aggregated A/V content information and/or A/V content sources may be performed on an internal startup, scheduled, or other operation or event associated with the DLNA server 102.

Though not illustrated within FIG. 5 for ease of illustration purposes, it is understood that this additional processing may be associated with the process 500 or any other process described herein to identify available web-based servers, such as the web-based server_1 114 through the web-based server_N 116, that store A/V content and that provide A/V content information. This additional processing may take the form of the example messaging described above in association with FIG. 3 for retrieving a service list from the web-based provisioning server 112. For purposes of the present description, web-based servers may be considered available if they publish or otherwise provide A/V content and associated A/V content information, and are accessible via the network 110.

Continuing with the description of decision point 506, when a determination is made that a local list of aggregated A/V content information is complete, the process 500 generates a response to the A/V content information request including aggregated A/V content information at block 508. As described above, detailed messaging will not be described herein as a person of skill in the art can create appropriate messages for use in association with the present subject matter based upon the description herein. At block 510, the process 500 sends the response to the A/V content information request to the requesting device and returns to decision point 502 to await another A/V content information request.

Returning to the description of decision point 506, when a determination is made that a local list of aggregated A/V content information is not complete, the process 500 retrieves a list of available web-based servers that store A/V content at block 512. The process of retrieving the list of available web-based servers may take the form of the example messaging described above in association with FIG. 3 for retrieving a service list from the web-based provisioning server 112. At block 514, the process 400 selects web-based servers from the list of available web-based servers via which to update the list of aggregated A/V content information. This selection of web-based servers may be based upon filtering within the received A/V content information request message, desired or available bandwidth, storage availability, or any other selection criteria.

The process 500 generates a web protocol A/V content information request message for each of the selected web-based servers at block 516. An example web protocol A/V content information request message may include a markup language message, such as an HTTP-formatted "Get Asset List" message, for requesting the A/V content information list from the target devices. Each HTTP-formatted "Get Asset List" message may be directed to the IP address and port of the respective target server (e.g., 192.168.22.11:8080) and may include filtering or other indicia for selectively requesting certain types of A/V content information, such as "video" content information. As indicated above, a person of skill in the art can create appropriate messages for use in association with the present subject matter based upon the description herein.

At block 518, the process 500 sends the associated web protocol A/V content information request message to each of the selected web-based servers. The process 500 waits at decision point 520 for all anticipated responses to be received. It should be noted that time out procedures and other error control procedures are not illustrated within the example process 500 for ease of illustration purposes. However, it is understood that all such procedures are considered to be within the scope of the present subject matter for the example process 500 or any other process described below.

Regarding the format of the responses received in association with decision point 520, an example format for the response messages may include a markup language message, such as an HTTP-formatted Response message including a content list, for providing the A/V content information list from the target servers. Each item of A/V content identified within the HTTP-formatted Response message may include A/V content information in the form of the URIs described above that form hyperlinks to the storage location of the referenced A/V content. Additionally, the A/V content information may include URIs that form hyperlinks to thumbnail images and other information, such as a server identifier, without departure from the scope of the present subject matter. Additional information may include a title, description, rating and other information associated with the A/V items within the content list. As indicated above, it is understood that a person of skill in the art can create appropriate messages for use in association with the present subject matter based upon the description herein.

When a determination is made at decision point 520 that all anticipated responses have been received, the process 500 forms the A/V content information received from each web-based server into a hierarchical representation to aggregate the received A/V content information at block 522. As described above, the A/V content information includes URIs to items of A/V content and thumbnail images stored in association with each of the web-based servers. Additional processing at block 522 includes mapping URIs associated with the A/V content to local reference URIs associated with the DLNA server 102 and storing the local reference URIs with the aggregated A/V content information. As such, the DLNA client 106 may request items of A/V content or thumbnail images from the DLNA server 102 using the local reference URIs rather than the URIs that reference the A/V content or thumbnail image storage at the web-based servers. As will be described in association with FIG. 6 below, the local reference URI is mapped back to the URI associated with the respective web-based server in response to a request for A/V content.

Returning to the description of block 522, the hierarchical representation may be any convenient form of structuring the A/V content information received to allow a user of a DLNA client device, such as the DLNA client 106, to navigate the A/V content information to select an item of A/V content for retrieval and rendering. For example, the hierarchical representation may be in the form of a directory structure type of representation associating each of the web-based servers with its respective A/V content information.

At block 524, the process 500 stores the aggregated hierarchical representation in association with local A/V content information to further aggregate the received A/V content information with local A/V content information. The process 500 continues to blocks 508 and 510 to continue processing as described above to generate and send a DLNA content list message to the requesting device, and returns to decision point 502 to await a new A/V content information request.

Accordingly, the process 500 automatically aggregates A/V content information representing available A/V content associated with the DLNA server 102 and A/V content located outside of the home network 104 for access by users of DLNA client devices within the home network 104.

Figure 6:
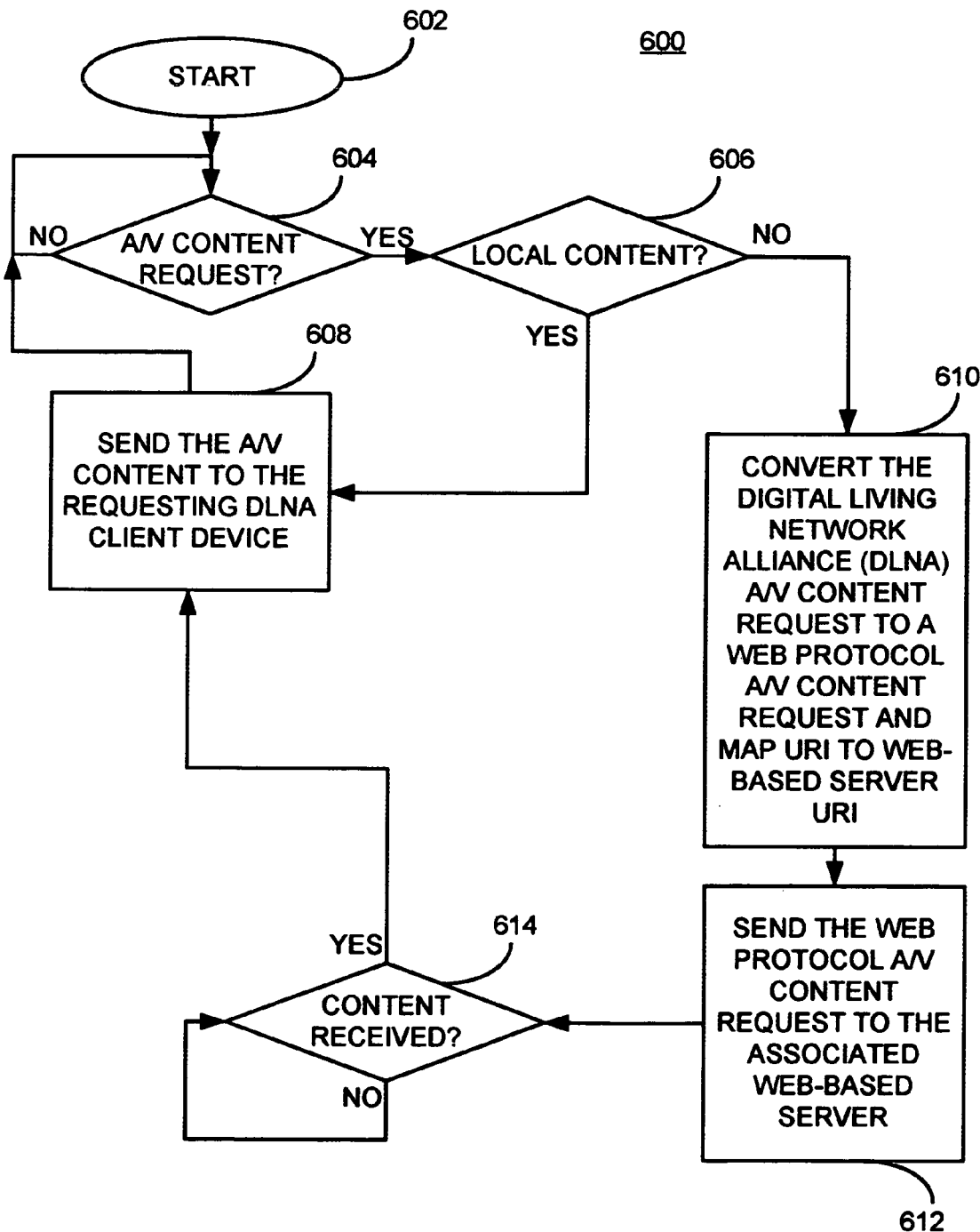
FIG. 6 is a flow chart of an example of an implementation of a process that provides A/V content from either local storage or as a proxy from a location outside of a home network based upon aggregated A/V content information representing available A/V content associated with a DLNA server and A/V content located outside of the home network consistent with certain embodiments of the present invention.

FIG. 6 is a flow chart of an example of an implementation of a process 600 that provides A/V content from either local storage or as a proxy from a location outside of the home network 104 based upon aggregated A/V content information representing available A/V content associated with the DLNA server 102 and A/V content located outside of the home network 104. The process 600 starts at 602. At decision point 604, the process 600 makes a determination as to whether a DLNA A/V content request message has been received. For purposes of the present example, it should be sufficient to note that a request for an item of A/V content may include a URI associated with the requested item of A/V content previously obtained within a content list. As described above, the URI is associated with the DLNA server 102 and has been mapped from the associated URI of the item of A/V content at the associated web-based server. As with other messaging described above, a person of skill in the art can create appropriate messages for use in association with the present subject matter based upon the description herein.

When a determination is made at decision point 604 that a DLNA A/V content request message has been received, the process 600 makes a determination at decision point 606 as to whether the requested item of A/V content is local content or content located outside of the home network 104. When a determination is made that the A/V content is stored locally, the process 600 sends the requested A/V content by initiating a transfer of the requested A/V content to the requesting DLNA client device at block 608. The process 600 returns to decision point 604 to await a new A/V content request. The requesting device may use additional DLNA messaging such as a DLNA "Get Transfer Progress" message to determine the status of the transfer.

Returning to the description of decision point 606, when a determination is made that the content is located outside of the home network 104, the process 600 converts the received A/V content request message to a web protocol A/V content request and maps the URI within the request to the cross-referenced URI associated with the web-based server where the item of A/V content is stored at block 610. The web protocol A/V content request may include a markup language message, such as an HTTP-formatted "Get" message including the URI of the requested A/V content. At block 612, the process 600 sends the web protocol A/V content request message to the associated web-based server, such as the web-based server_1 114 through the web-based server_N 116, that stores the requested A/V content. At decision point 614, the process 600 waits for the A/V content to be received via a web protocol response message format from the associated web-based device. The web protocol response message may include a markup language message, such as an HTTP-formatted "Response" message including the URI of the requested A/V content. When the web protocol response message including the requested A/V content has been received, the process 600 returns to block 608 to send the requested A/V content by initiating transfer of the requested A/V content to the requesting DLNA client device as described above and returns to decision point 604 to await a new A/V content request.

Accordingly, the process 600 provides A/V content from either local storage or from a location outside of the home network 104 based upon aggregated A/V content information representing available A/V content associated with the DLNA server 102 and A/V content located outside of the home network 104.

While the example described in association with FIG. 6 illustrates the DLNA server 102 operating as a proxy to retrieve A/V content located outside of the home network 104 for the DLNA client 106, this should not be considered limiting. As described above in association with FIG. 1, the DLNA client 106 may be configured to have access to the network 110 in addition to the home network 104. As also described above, the content list provided to the DLNA client 106 includes URIs to the A/V content information in the form of hypertext links. Accordingly, when the DLNA client 106 has access to the network 104, the DLNA client 106 may communicate directly with the appropriate web-based server using an HTTP-formatted "Get" message to retrieve the requested item of A/V content without using the DLNA server 102 as a proxy. Regardless of whether the DLNA server 102 is used as a proxy for the DLNA client 106, the web-based provisioning server 112 may operate as appropriate to facilitate authorization of either device for download of the requested A/V content.

Based upon the foregoing description, the present subject matter provides a Digital Living Network Alliance (DLNA) server device with bridging capabilities for accessing audio and video (A/V) content information representing A/V content stored outside of a home network. The DLNA server also provides aggregation capabilities for organizing the accessed A/V content information from one or more outside sources with locally-stored A/V content information for access and rendering of A/V content within the home network. The accessed A/V content information may be stored in association with web-based servers that are accessible to an Internet video link (IVL) provisioning server, known in one form commercially via a trademark of Sony Electronics Inc. as the Bravia™ Internet Video Link (BIVL™) provisioning server. The IVL provisioning server establishes account and access privileges with the web-based servers and provides a list of available and authorized servers to the DLNA server. The DLNA server communicates with the authorized web-based servers from the list to retrieve A/V content information for aggregation. A user of a DLNA client device within the home network may select an item of aggregated A/V content stored outside of the home network or stored locally on the DLNA server for rendering within the home network. The DLNA client device may use the DLNA server as a proxy to retrieve the A/V content or may access the associated web-server directly to retrieve the A/V content.

So, in accord with the above description, A/V content information is acquired from each of a plurality of web-based servers located outside of a home network, where the A/V content information identifies A/V content stored in association with each of the plurality of web-based servers. The A/V content information acquired from each of the plurality of web-based servers is aggregated. The aggregated A/V content information is provided to a DLNA client device within the home network.

Thus, in accord with certain implementations, a method of aggregating audio and video (A/V) content located outside a Digital Living Network Alliance (DLNA) home network for access within the DLNA home network involves acquiring A/V content information from each of a plurality of web-based servers located outside of a home network, where the A/V content information identifies A/V content stored in association with each of the plurality of web-based servers; aggregating the A/V content information acquired from each of the plurality of web-based servers; and providing the aggregated A/V content information to a DLNA client device within the home network.

In certain implementations, the method of aggregating audio and video (A/V) content located outside a Digital Living Network Alliance (DLNA) home network for access within the DLNA home network further involves requesting the A/V content information from the plurality of web-based servers located outside of the home network and receiving the A/V content information from each of the plurality of web-based servers. In certain implementations, the method further involves generating a web protocol A/V content information request associated with each of the plurality of web-based servers and sending the associated web protocol A/V content information request to each of the plurality of web-based servers. In certain implementations, the method further involves generating a hypertext transfer protocol (HTTP)-based message associated with each of the plurality of web-based servers. In certain implementations, the method further involves receiving a web protocol A/V content information response from each of the plurality of web-based servers each including the A/V content information acquired from each of the plurality of web-based servers. In certain implementations, the method further involves storing the A/V content information acquired from each of a plurality of web-based servers with local A/V content information that represents A/V content stored within a locally-accessible A/V content storage medium. In certain implementations, the method further involves forming the A/V content information acquired from each of the plurality of web-based servers into a hierarchical representation navigable by a user of the DLNA client device. In certain implementations, the method further involves providing the hierarchical representation to the DLNA client device. In certain implementations, the method further involves generating a DLNA content list message representing the hierarchical representation and sending the DLNA content list message to the DLNA client device. In certain implementations, each item of A/V content information received from each of the plurality of web-based servers further includes a received uniform resource identifier (URI) associated with an item of A/V content and the method further involves mapping each received URI to a local reference URI. In certain implementations, the method further involves providing the local reference URI associated with each item of A/V content information to the DLNA client device. In certain implementations, the method further involves receiving a list of provisioned web-based servers from which the plurality of web-based servers is selected. In certain implementations, the method further involves receiving the list of provisioned web-based servers from an Internet video link (IVL) provisioning server. In certain implementations, the A/V content information acquired from each of the plurality of web-based servers further includes at least one of a uniform resource identifier (URI) associated with an item of A/V content and a URI associated with a thumbnail image associated with the item of A/V content. In certain implementations, the method further involves receiving a DLNA request from the DLNA client device for an item of A/V content identified by an item of the aggregated A/V content information. In certain implementations, the method further involves converting the DLNA request to a web protocol request including the item of the aggregated A/V content information and requesting the item of A/V content from the associated web-based device using the web protocol request. In certain implementations, the method further involves mapping a local reference uniform resource identifier (URI) associated with the requested item of A/V content to a URI associated with a storage location for the requested item of A/V content at the associated web-based device. In certain implementations, the method further involves receiving the item of A/V content from the associated web-based device as at least a part of a web protocol response; converting the web protocol response to a DLNA response including the item of A/V content; and sending the DLNA response including the item of A/V content to the DLNA client device. In certain implementations, the A/V content information is acquired from each of a plurality of web-based servers in response to a DLNA request for A/V content information received from the DLNA client device.

A Digital Living Network Alliance (DLNA) audio and video (A/V) content aggregation device for aggregating content located outside a DLNA home network for access within the DLNA home network consistent with certain implementations has a memory adapted to store representations of A/V content. A processor is programmed to acquire A/V content information from each of a plurality of web-based servers located outside of a home network, where the A/V content information identifies A/V content stored in association with each of the plurality of web-based servers; aggregate the A/V content information acquired from each of the plurality of web-based servers; store the aggregated A/V content information to the memory; and provide the aggregated A/V content information to a DLNA client device within the home network.

In certain implementations, the processor is further programmed to request the A/V content information from the plurality of web-based servers located outside of the home network and receive the A/V content information from each of the plurality of web-based servers. In certain implementations, the processor is further programmed to generate a web protocol A/V content information request associated with each of the plurality of web-based servers and send the associated web protocol A/V content information request to each of the plurality of web-based servers. In certain implementations, the processor is further programmed to generate a hypertext transfer protocol (HTTP)-based message associated with each of the plurality of web-based servers. In certain implementations, the processor is further programmed to receive a web protocol A/V content information response from each of the plurality of web-based servers each including the A/V content information acquired from each of the plurality of web-based servers. In certain implementations, the processor is further programmed to store the A/V content information acquired from each of a plurality of web-based servers with local A/V content information that represents A/V content stored within the memory. In certain implementations, the processor is further programmed to form the A/V content information acquired from each of the plurality of web-based servers into a hierarchical representation navigable by a user of the DLNA client device. In certain implementations, the processor is further programmed to provide the hierarchical representation to the DLNA client device. In certain implementations, the processor is further programmed to generate a DLNA content list message representing the hierarchical representation and send the DLNA content list message to the DLNA client device. In certain implementations, each item of A/V content information received from each of the plurality of web-based servers further includes a received uniform resource identifier (URI) associated with an item of A/V content and the processor is further programmed to map each received URI to a local reference URI. In certain implementations, the processor is further programmed to provide the local reference URI associated with each item of A/V content information to the DLNA client device. In certain implementations, the processor is further programmed to receive a list of provisioned web-based servers from which the plurality of web-based servers is selected and to store the list within the memory. In certain implementations, processor is further programmed to receive the list from an Internet video link (IVL) provisioning server. In certain implementations, the A/V content information acquired from each of the plurality of web-based servers further comprises at least one of a uniform resource identifier (URI) associated with an item of A/V content and a URI associated with a thumbnail image associated with the item of A/V content. In certain implementations, the processor is further programmed to receive a DLNA request from the DLNA client device for an item of A/V content identified by an item of the aggregated A/V content information. In certain implementations, the processor is further programmed to convert the DLNA request to a web protocol request including the item of the aggregated A/V content information and request the item of A/V content from the associated web-based device using the web protocol request. In certain implementations, the processor is further programmed to map a local reference uniform resource identifier (URI) associated with the requested item of A/V content to a URI associated with a storage location for the requested item of A/V content at the associated web-based device. In certain implementations, the processor is further programmed to receive the item of A/V content from the associated web-based device as at least a part of a web protocol response; convert the web protocol response to a DLNA response including the item of A/V content; and send the DLNA response including the item of A/V content to the DLNA client device. In certain implementations, the processor is further programmed to acquire the A/V content information from each of a plurality of web-based servers is performed in response to a DLNA request for A/V content information received from the DLNA client device.

A Digital Living Network Alliance (DLNA) audio and video (A/V) content aggregation device for aggregating content located outside a DLNA home network for access within the DLNA home network consistent with certain implementations has a memory adapted to store representations of A/V content. A processor is programmed to receive the list of provisioned web-based servers located outside of a home network from an Internet video link (IVL) provisioning server; select a plurality of web-based servers from the list of provisioned web-based servers located outside of the home network; generate a hypertext transfer protocol (HTTP)-based A/V content information request message associated with each of a plurality of web-based servers located outside of a home network, where the A/V content information identifies A/V content stored in association with each of the plurality of web-based servers; send the HTTP-based A/V content information request message to each of a plurality of web-based servers; receive an HTTP response message including the A/V content information associated with each of the plurality of web-based servers from each of the plurality of web-based servers; form the A/V content information received from each of the plurality of web-based servers into a hierarchical representation; aggregate the hierarchical representation of the A/V content information received from each of the plurality of web-based servers; combine the aggregated hierarchical representation with a hierarchical representation of local A/V content information that represents A/V content stored within the memory; store the combined aggregated hierarchical representation of the A/V content information to the memory; generate a DLNA content list message representing the combined aggregated hierarchical representation of the A/V content information; and send the DLNA content list message to a DLNA client device within the home network.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface processing and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of aggregating audio and video (A/V) content located outside a Digital Living Network Alliance (DLNA) home network for access within the DLNA home network, comprising:
    at a DLNA-Internet bridging proxy server located outside of the DLNA home network:
    acquiring A/V content information from each of a plurality of web-based servers located outside of a home network, where the A/V content information identifies A/V content stored in association with each of the plurality of web-based servers and where each item of A/V content information acquired from each of the plurality of web-based servers comprises a received uniform resource identifier (URI) to an item of A/V content;
    mapping each received URI to a local reference URI;
    aggregating the A/V content information acquired from each of the plurality of web-based servers with the mapped local reference URI to each item of A/V content;
    providing the aggregated A/V content information to a DLNA client device within the home network;
    detecting a request for the item of A/V content associated with one mapped local reference URI;
    mapping the one mapped local reference URI to the received URI to the item of A/V content stored in the associated one of the plurality of web-based servers; and
    retrieving, in response to the request for the item of A/V content, the item of A/V content from the associated one of the plurality of web-based servers located outside of the home network that stores the item of A/V content using the received URI to the item of A/V content.

2. The method according to claim 1, where acquiring the A/V content information comprises requesting the A/V content information from the plurality of web-based servers located outside of the home network and receiving the A/V content information from each of the plurality of web-based servers.

3. The method according to claim 2, where requesting the A/V content information from the plurality of web-based servers located outside of the home network comprises generating a web protocol A/V content information request associated with each of the plurality of web-based servers and sending the associated web protocol A/V content information request to each of the plurality of web-based servers.

4. The method according to claim 3, where generating the web protocol A/V content information request associated with each of the plurality of web-based servers comprises generating a hypertext transfer protocol (HTTP)-based message associated with each of the plurality of web-based servers.

5. The method according to claim 3, where acquiring the A/V content information comprises receiving a web protocol A/V content information response from each of the plurality of web-based servers each including the A/V content information acquired from each of the plurality of web-based servers.

6. The method according to claim 1, where aggregating the A/V content information acquired from each of the plurality of web-based servers comprises storing the A/V content information acquired from each of the plurality of web-based servers with local A/V content information that represents A/V content stored within a locally-accessible A/V content storage medium.

7. The method according to claim 1, where aggregating the A/V content information acquired from each of the plurality of web-based servers comprises forming the A/V content information acquired from each of the plurality of web-based servers into a hierarchical representation navigable by a user of the DLNA client device.

8. The method according to claim 7, where providing the aggregated A/V content information to the DLNA client device within the home network comprises providing the hierarchical representation to the DLNA client device.

9. The method according to claim 8, where providing the hierarchical representation to the DLNA client device comprises generating a DLNA content list message representing the hierarchical representation and sending the DLNA content list message to the DLNA client device.

10. The method according to claim 1, where providing the aggregated A/V content information comprises providing the local reference URI associated with each item of A/V content information to the DLNA client device.

11. The method according to claim 1, further comprising receiving a list of provisioned web-based servers from which the plurality of web-based servers is selected.

12. The method according to claim 11, further comprising receiving the list of provisioned web-based servers from an Internet video link (IVL) provisioning server.

13. The method according to claim 1, where the A/V content information acquired from each of the plurality of web-based servers further comprises a URI to a thumbnail image associated with the item of A/V content.

14. The method according to claim 1, further comprising receiving a DLNA request from the DLNA client device for an item of A/V content identified by an item of the aggregated A/V content information.

15. The method according to claim 14, further comprising converting the DLNA request to a web protocol request including the item of the aggregated A/V content information and requesting the item of A/V content from the associated one of the plurality of web-based servers using the web protocol request.

16. The method according to claim 15, where converting the DLNA request to the web protocol request comprises mapping the local reference uniform resource identifier (URI) associated with the requested item of A/V content to a URI associated with a storage location for the requested item of A/V content at the associated one of the plurality of web-based servers.

17. The method of claim 15, further comprising:
    receiving the item of A/V content from the associated one of the plurality of web-based servers as at least a part of a web protocol response;

converting the web protocol response to a DLNA response including the item of A/V content; and sending the DLNA response including the item of A/V content to the DLNA client device.

18. The method according to claim 1, where acquiring the A/V content information from each of a plurality of web-based servers is performed in response to a DLNA request for A/V content information received from the DLNA client device.

19. A Digital Living Network Alliance (DLNA)-Internet bridging proxy server device for aggregating audio and video (A/V) content located outside a DLNA home network for access within the DLNA home network, comprising:

a memory adapted to store representations of A/V content; and a processor forming a portion of the DLNA-Internet bridging proxy server device located outside of the DLNA home network, where the DLNA-Internet bridging proxy server device is programmed to:

acquire A/V content information from each of a plurality of web-based servers located outside of a home network, where the A/V content information identifies A/V content stored in association with each of the plurality of web-based servers and where each item of A/V content information acquired from each of the plurality of web-based servers comprises a received uniform resource identifier (URI) to an item of A/V content;

map each received URI to a local reference URI;

aggregate the A/V content information acquired from each of the plurality of web-based servers with the mapped local reference URI to each item of A/V content;

store the aggregated A/V content information to the memory;

provide the aggregated A/V content information to a DLNA client device within the home network;

detect a request for the item of A/V content associated with one mapped local reference URI;

map the one mapped local reference URI to the received URI to the item of A/V content; and retrieve, in response to the request for the item of A/V content, the item of A/V content from the associated one of the plurality of web-based servers located outside of the home network that stores the item of A/V content using the received URI to the item of A/V content.

20. The device according to claim 19, where, in being programmed to acquire the A/V content, the processor is programmed to request the A/V content information from the plurality of web-based servers located outside of the home network and receive the A/V content information from each of the plurality of web-based servers.

21. The device according to claim 20, where, in being programmed to request the A/V content information from the plurality of web-based servers located outside of the home network, the processor is programmed to generate a web protocol A/V content information request associated with each of the plurality of web-based servers and send the associated web protocol A/V content information request to each of the plurality of web-based servers.

22. The device according to claim 21, where, in being programmed to generate the web protocol A/V content information request associated with each of the plurality of web-based servers, the processor is programmed to generate a hypertext transfer protocol (HTTP)-based message associated with each of the plurality of web-based servers.

23. The device according to claim 21, where, in being programmed to acquire the A/V content information, the processor is programmed to receive a web protocol A/V content information response from each of the plurality of web-based servers each including the A/V content information acquired from each of the plurality of web-based servers.

24. The device according to claim 19, where, in being programmed to aggregate the A/V content information acquired from each of the plurality of web-based servers, the processor is programmed to store the A/V content information acquired from each of the plurality of web-based servers with local A/V content information that represents A/V content stored within the memory.

25. The device according to claim 19, where, in being programmed to aggregate the A/V content information acquired from each of the plurality of web-based servers, the processor is programmed to form the A/V content information acquired from each of the plurality of web-based servers into a hierarchical representation navigable by a user of the DLNA client device.

26. The device according to claim 25, where, in being programmed to provide the aggregated A/V content information to the DLNA client device within the home network, the processor is programmed to provide the hierarchical representation to the DLNA client device.

27. The device according to claim 26, where, in being programmed to provide the hierarchical representation to the DLNA client device, the processor is programmed to generate a DLNA content list message representing the hierarchical representation and send the DLNA content list message to the DLNA client device.

28. The device according to claim 19, where, in being programmed to provide the aggregated A/V content information, the processor is programmed to provide the local reference URI associated with each item of A/V content information to the DLNA client device.

29. The device according to claim 19, where the processor is further programmed to receive a list of provisioned web-based servers from which the plurality of web-based servers is selected and to store the list within the memory.

30. The device according to claim 29, where processor is further programmed to receive the list of provisioned web-based servers from an Internet video link (IVL) provisioning server.

31. The device according to claim 19, where the A/V content information acquired from each of the plurality of web-based servers further comprises a URI to a thumbnail image associated with the item of A/V content.

32. The device according to claim 19, where the processor is further programmed to receive a DLNA request from the DLNA client device for an item of A/V content identified by an item of the aggregated A/V content information.

33. The device according to claim 32, where the processor is further programmed to convert the DLNA request to a web protocol request including the item of the aggregated A/V content information and request the item of A/V content from the associated one of the plurality of web-based servers using the web protocol request.

34. The device according to claim 33, where, in being programmed to convert the DLNA request to the web protocol request, the processor is programmed to map the local reference uniform resource identifier (URI) associated with the requested item of A/V content to a URI associated with a storage location for the requested item of A/V content at the associated one of the plurality of web-based servers.

35. The device of claim 33, where the processor is further programmed to:

receive the item of A/V content from the associated one of the plurality of web-based servers as at least a part of a web protocol response;

convert the web protocol response to a DLNA response including the item of A/V content; and send the DLNA response including the item of A/V content to the DLNA client device.

36. The device according to claim 19, where the processor is programmed to acquire the A/V content information from each of a plurality of web-based servers in response to a DLNA request for A/V content information received from the DLNA client device.

37. A Digital Living Network Alliance (DLNA) audio and video (A/V) content aggregation device for aggregating content located outside a DLNA home network for access within the DLNA home network, comprising:

a memory adapted to store representations of A/V content;

a processor located outside of the DLNA home network programmed to:

receive the list of provisioned web-based servers located outside of a home network from an Internet video link (IVL) provisioning server;

select a plurality of web-based servers from the list of provisioned web-based servers located outside of the home network;

generate a hypertext transfer protocol (HTTP)-based A/V content information request message associated with each of a plurality of web-based servers, where the A/V content information identifies A/V content stored in association with each of the plurality of web-based servers;

send the HTTP-based A/V content information request message to each of a plurality of web-based servers;

receive an HTTP response message including the A/V content information associated with each of the plurality of web-based servers from each of the plurality of web-based servers;

form the A/V content information received from each of the plurality of web-based servers into a hierarchical representation;

aggregate the hierarchical representation of the A/V content information received from each of the plurality of web-based servers;

combine the aggregated hierarchical representation with a hierarchical representation of local A/V content information that represents A/V content stored within the memory;

store the combined aggregated hierarchical representation of the A/V content information to the memory;

generate a DLNA content list message representing the combined aggregated hierarchical representation of the A/V content information; and send the DLNA content list message to a DLNA client device within the home network.

38. A method of aggregating audio and video (A/V) content located outside a Digital Living Network Alliance (DLNA) home network for access within the DLNA home network, comprising:

at a DLNA-Internet bridging proxy server located outside of the DLNA home network:

acquiring A/V content information from each of a plurality of Internet-accessed Internet-based servers located outside of a home network, where the A/V content information identifies A/V content stored in association with each of the plurality of Internet-accessed Internet-based servers and where each item of A/V content information acquired from each of the plurality of Internet-accessed Internet-based servers comprises a received uniform resource identifier (URI) to an item of A/V content;

mapping each received URI to a local reference URI for the respective item of A/V content without locally storing the respective item of A/V content;

aggregating the A/V content information acquired from each of the plurality of Internet-accessed Internet-based servers with the mapped local reference URI to each item of A/V content;

providing the aggregated A/V content information to a DLNA client device within the home network;

detecting a request for the item of A/V content associated with one mapped local reference URI;

mapping the one mapped local reference URI to the received URI to the item of A/V content stored in the associated one of the plurality of Internet-accessed Internet-based servers; and retrieving, in response to the request for the item of A/V content, the item of A/V content from the associated one of the plurality of Internet-accessed Internet-based servers located outside of the home network that stores the item of A/V content using the received URI to the item of A/V content.

* * * * *